F. BOHN.

LIFE SAVING DEVICE FOR OCEAN VESSELS.

APPLICATION FILED JUNE 23, 1917.

Reissued July 24, 1917.

14,329.

2 SHEETS—SHEET 1.

Inventor

Frank Bohn.

By C. L. Parker.

Attorney

F. BOHN.

LIFE SAVING DEVICE FOR OCEAN VESSELS.

APPLICATION FILED JUNE 23, 1917.

Reissued July 24, 1917. 14,329.

2 SHEETS—SHEET 2.

Inventor

Frank Bohn.

By C. L. Parker.

Attorney

UNITED STATES PATENT OFFICE.

FRANK BOHN, OF BALTIMORE, MARYLAND.

LIFE-SAVING DEVICE FOR OCEAN VESSELS.

14,329. Specification of Reissued Letters Patent. Reissued July 24, 1917.

Original No. 1,226,055, dated May 15, 1917, Serial No. 114,286, filed August 10, 1916. Application for reissue filed June 23, 1917. Serial No. 176,931.

*To all whom it may concern:*

Be it known that I, FRANK BOHN, a citizen of the United States, residing at Baltimore, in the county of Baltimore and State of Maryland, have invented certain new and useful Improvements in Life-Saving Devices for Ocean Vessels; and it is hereby declared that the following is a full, clear, and exact description of the invention, such as will enable others skilled in the art to which it appertains to make and use the same.

My invention relates to improvements in ships wherein a float is arranged upon or carried by the hull of the ship and is adapted to be released or separated from the hull, upon the sinking of the hull.

An important object of the invention is to provide means whereby the detachable float will not bind or jam with the hull to prevent proper separation, and the float will remain substantially vertical, during such separation.

A further object of the invention is to provide means tending to separate the float and hull, and to overcome the downward suction upon the float due to the sinking of the hull.

Other objects and advantages of the invention will be apparent during the course of the following description.

Figure 1:
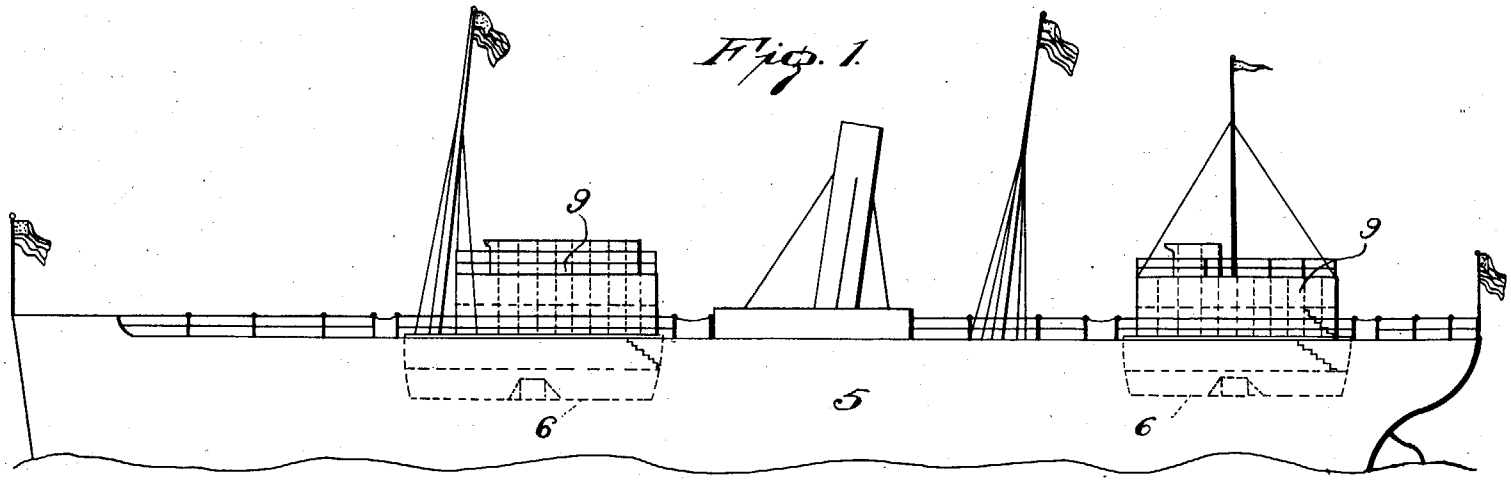
Figure 2:
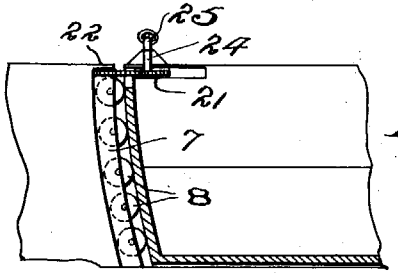
Figures 3, 4:
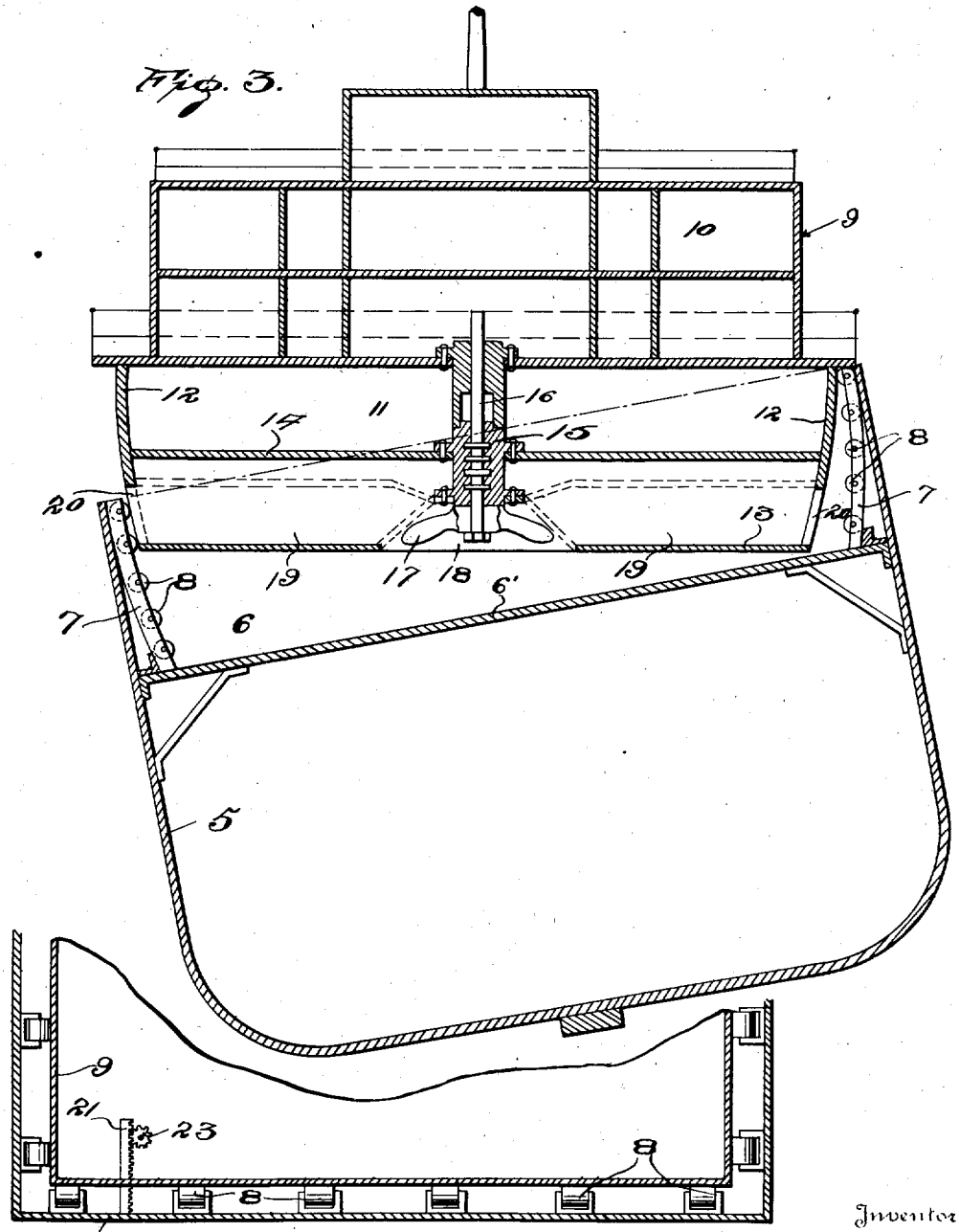

In the accompanying drawings forming a part of this specification and in which like numerals are employed to designate like parts throughout the same, Figure 1 is a side elevation of a ship embodying the invention, Fig. 2 is a detail section through the float and hull, showing a lock device, Fig. 3 is a transverse sectional view through the float and hull showing the float in the act of being separated from the hull, and, Fig. 4 is a fragmentary horizontal section through the hull and float with the float in the normal position.

In the drawings, wherein for the purpose of illustration is shown a preferred embodiment of my invention, the numeral 5 designates the hull of a ship or boat. As shown in Fig. 1, this hull is provided with a pair of compartments 6, open at the top.

Each compartment has its four walls equipped with rails 7, which are generally upstanding and curved longitudinally, as shown. These rails 7 are rigidly attached to the side walls and bottom 6′ of the compartment by any suitable means. Rotatably mounted within the rails 7 are rollers 8. The rollers of one wall have their inner contacting sides arranged in the arc of a circle, whose radius has its center in a line drawn through the upper ends of the rails 7 of the opposite wall. It is of course understood that this arrangement is the same for the rollers of each wall. The rollers 8 constitute the contacting surfaces of the compartment.

The numeral 9 designates a float of any well known or preferred construction, having an upper portion 10 and a lower portion 11. The lower portion of the float comprises side walls 12 and a bottom 13, with an upper false bottom 14, as shown. The walls 12 are curved vertically and are cut on arcs which are concentric with the arcs defined by the contacting inner faces of the rollers 8, it being understood however that the arcs of the side walls 12 have a slightly smaller radius than the arcs of the rollers. It is thus apparent that the lower portion 11 of the float is contained within the compartment 6 and may be readily removed therefrom. As shown in Fig. 3, as the hull 5 tilts when sinking, by virtue of the arrangement of the rollers 8, and the curvature of the side walls 12, portions of such side walls remain permanently in contact with the oppositely arranged sets of rollers, thus preventing any undue horizontal movement of the float with respect to the hull while the float is maintained vertical. This prevents any jars which might tend to destroy the float, and the float is free to separate from the hull without liability of jamming.

Rigidly mounted within the lower portion 11 of the float 9 is a vertical bearing 15, within which is mounted to rotate a vertical shaft 16 driven by any suitable means. To the lower end of the shaft 16 is secured a downwardly directed propeller 17, operating in proximity to an opening 18. This opening communicates with horizontal passages 19 having communication with openings 20. The function of this propeller is to draw water through the openings 20 and passages 19, and discharge the same through the opening 18 against the bottom 6′ of the compartment 6, thus tending to separate the float from the bottom and to elevate the float, for overcoming downward suction action due to the sinking of the hull.

In order that the float may remain securely attached to the hull 5 when it is not desired that they should separate, I provide a plurality of reciprocatory rack-bars 21, one rack-bar being preferably arranged at each corner of the float. The rack-bar 21 is adapted to slide beneath a bar 22 carried by the hull 5. The rack-bar 21 is moved by a pinion 23, rigidly attached to a vertical shaft 24, turned by a hand wheel 25.

In operation, when the ship is sinking, an attendant is stationed at each corner of the float, and at the proper time actuates the hand wheel 25 to draw the rack-bar 21 from beneath the bar 2. As the hull 5 descends in the water, the float contacts with the water and is gradually separated from the hull, such separation taking place irrespective of whether or not the hull is inclined transversely or longitudinally vertically upon sinking. The propeller 17 is set into action during the sinking of the hull, and by drawing in water through the passages 19 and discharging the same to the opening 18 against the bottom 6, serves to move the float upwardly and separate the same from the hull, also tending to overcome the downward pull due to the sinking of the hull.

It is to be understood that the form of my invention herewith shown and described is to be taken as a preferred example of the same, and that various changes in the shape, size, and arrangement of parts may be resorted to without departing from the spirit of the invention or the scope of the subjoined claims.

Having thus described my invention, I claim:

1. The combination with the hull of a ship having a compartment in the upper portion thereof which has its upper end open, of a float located in the compartment, and a downwardly directed propeller connected with the lower portion of the float.

2. The combination with the hull of a ship having a compartment in the upper portion thereof which has its upper end open, of a float located in the compartment and provided in its bottom with an opening and channels for supplying water to the opening, and a downwardly directed propeller connected with the float and arranged in proximity to the opening.

3. The combination with the hull of a ship having a compartment in the top thereof which has its upper end open, of a float located in the compartment and having an upper false bottom and a lower bottom, the lower bottom being provided with a water discharge opening having communication with water supply passages, a downwardly directed propeller arranged between the upper false bottom and the lower bottom in proximity to the opening, and means to rotate the propeller.

4. The combination with the hull of a ship provided in its upper portion with a compartment which has its upper end open, said compartment having the contacting portions of each side wall thereof disposed in the arc of a circle, the radius of which has its center taken at the upper end of the opposite wall; of a float arranged within the compartment and having curved side walls to coöperate with the contacting portions of the compartments, the curved side walls being taken on arcs which are concentric with the first named arcs.

5. The combination with the hull of a ship provided in its upper portion with a compartment which has its upper end open, of rollers secured to the sides of the compartment, the contacting inner surfaces of the rollers of each side defining an arc of a circle, the radius of which has its center taken at the top of the opposite side; of a float arranged within the compartment and having curved sides to coöperate with the rollers, the curved sides being taken on arcs which are concentric with the first named arcs.

In testimony whereof I affix my signature in the presence of two witnesses.

FRANK BOHN.

Witnesses:

HENRY REHLING, Jr.,
FRANK A. BAKER.